United States Patent
Wang et al.

(10) Patent No.: US 11,668,504 B2
(45) Date of Patent: Jun. 6, 2023

(54) OIL RETURN CONTROL METHOD AND DEVICE OF AIR CONDITIONING SYSTEM, STORAGE MEDIUM AND AIR CONDITIONING SYSTEM

(71) Applicants: HEFEI MIDEA HEATING & VENTILATING EQUIPMENT CO., LTD., Hefei (CN); GD MIDEA HEATING & VENTILATING EQUIPMENT CO., LTD., Foshan (CN)

(72) Inventors: Xinli Wang, Hefei (CN); Meibing Xiong, Hefei (CN); Mingkun Feng, Hefei (CN); Haowei Zhao, Hefei (CN); Jiajin Liu, Hefei (CN)

(73) Assignees: HEFEI MIDEA HEATING AND VENTILATING EQUIPMENT CO., LTD., Hefei (CN); GD MIDEA HEATING AND VENTILATING EQUIPMENT CO., LTD., Foshan (CN)

( * ) Notice: Subject to any disclaimer, the term of this patent is extended or adjusted under 35 U.S.C. 154(b) by 221 days.

(21) Appl. No.: 16/619,662

(22) PCT Filed: Jun. 3, 2019

(86) PCT No.: PCT/CN2019/089870
§ 371 (c)(1),
(2) Date: Dec. 5, 2019

(87) PCT Pub. No.: WO2020/082742
PCT Pub. Date: Apr. 30, 2020

(65) Prior Publication Data
US 2020/0166258 A1    May 28, 2020

(30) Foreign Application Priority Data

Oct. 22, 2018 (CN) .......................... 201811235329.0

(51) Int. Cl.
*F24F 1/32* (2011.01)
*F25B 31/00* (2006.01)
(Continued)

(52) U.S. Cl.
CPC .............. *F25B 49/022* (2013.01); *F24F 1/32* (2013.01); *F24F 11/61* (2018.01); *F25B 29/003* (2013.01);
(Continued)

(58) Field of Classification Search
CPC .... F25B 43/02; F25B 41/26; F25B 2313/007; F25B 31/004; F25B 2500/16;
(Continued)

(56) References Cited

U.S. PATENT DOCUMENTS 4,765,149 A     8/1988  Shiga et al.
2003/0200763 A1* 10/2003 Takeuchi ........... B60H 1/00921
                                                    62/324.6
(Continued)

FOREIGN PATENT DOCUMENTS

CN     1392383 A    1/2003
CN   101131246 A    2/2008
(Continued)

OTHER PUBLICATIONS

First Chinese Office Action from Chinese Patent Application No. 201811235329.0 dated May 9, 2020.
(Continued)

*Primary Examiner* — Jerry-Daryl Fletcher
*Assistant Examiner* — Daniel C Comings
(74) *Attorney, Agent, or Firm* — Dilworth & Barrese, LLP.; Michael J. Musella, Esq.

(57) ABSTRACT

An air conditioning system includes a storage medium and an air conditioning system, for a three-pipe air conditioning system, the three-pipe air conditioning system includes a
(Continued)

compressor, an outdoor heat exchanger, an indoor heat exchanger, a gas-liquid separator, a first pipeline, a second pipeline and a third pipeline; the oil return control method comprises the following steps: controlling the compressor to operate at a first frequency in a refrigerating mode; judging whether the operation duration of the refrigerating mode reaches a first preset time or not; if so, the air conditioning system enters an oil return state, and the compressor, the third pipeline, the second pipeline and the gas-liquid separator are controlled to be communicated in sequence to form a refrigerant circulation loop.

17 Claims, 5 Drawing Sheets

(51) Int. Cl.
  *F25B 49/02* (2006.01)
  *F24F 11/61* (2018.01)
  *F25B 43/02* (2006.01)
  *F25B 29/00* (2006.01)
  *F25B 41/26* (2021.01)

(52) U.S. Cl.
  CPC ............ *F25B 31/004* (2013.01); *F25B 43/02* (2013.01); *F24F 2221/54* (2013.01); *F25B 41/26* (2021.01); *F25B 2313/007* (2013.01); *F25B 2400/077* (2013.01); *F25B 2500/16* (2013.01); *F25B 2600/01* (2013.01); *F25B 2600/025* (2013.01)

(58) Field of Classification Search
  CPC ............ F25B 2600/01; F25B 2600/025; F25B 2600/23; F24F 1/26; F24F 1/32; F24F 11/67
  See application file for complete search history.

(56) References Cited

U.S. PATENT DOCUMENTS

| 2004/0159111 A1* | 8/2004 | Takegami | F25B 41/20 62/84 |
|---|---|---|---|
| 2008/0134701 A1* | 6/2008 | Christensen | F25B 31/002 62/193 |
| 2008/0209924 A1 | 9/2008 | Yoon et al. | |
| 2013/0145785 A1 | 6/2013 | Nobuhiro | |
| 2014/0007601 A1* | 1/2014 | Tamura | F24F 11/62 62/160 |
| 2016/0257549 A1* | 9/2016 | Volftsun | B67D 7/08 |
| 2020/0166258 A1 | 5/2020 | Wang et al. | |

FOREIGN PATENT DOCUMENTS

| CN | 102338505 A | 2/2012 |
|---|---|---|
| CN | 102645057 A | 8/2012 |
| CN | 104236169 A | 12/2014 |
| CN | 104792076 A | 7/2015 |
| CN | 105066537 A | 11/2015 |
| CN | 106052189 A | 10/2016 |
| CN | 106440555 A | 2/2017 |
| CN | 107178833 A | 9/2017 |
| CN | 107178943 A | 9/2017 |
| CN | 107449173 A | 12/2017 |
| CN | 109297151 A | 2/2019 |
| JP | 1194373 A | 4/1999 |
| JP | 2000304397 A | 11/2000 |
| JP | 2001201215 A | 7/2001 |
| KR | 20060035246 A | 4/2006 |
| KR | 20060077217 A | 7/2006 |
| WO | 2020082742 A1 | 4/2020 |

OTHER PUBLICATIONS

International Search Report and Written Opinion dated Aug. 28, 2019 from State Intellectual Property Office of the P.R. China.
Canadian Office Action from Application No. 3065722 dated Aug. 12, 2022.

* cited by examiner

OIL RETURN CONTROL METHOD AND DEVICE OF AIR CONDITIONING SYSTEM, STORAGE MEDIUM AND AIR CONDITIONING SYSTEM

CROSS-REFERENCE TO RELATED APPLICATIONS

The present application is a U.S. national stage filing of PCT/CN2019/089870 filed Jun. 3, 2019, and is filed on the basis of and claims the priority of Chinese Patent Application No. 201811235329.0, filed on Oct. 22, 2018, the entire contents of each of which are incorporated herein by reference.

FIELD

The present disclosure relates to the technical field of air conditioning, in particular to an oil return control method and device of an air conditioning system, a storage medium for applying the oil return control method and the air conditioning system.

BACKGROUND

The three-pipe air conditioning system is widely used because it can simultaneously perform refrigerating and heating, and provides comfortable environment for people with different indoor requirements. Specifically, the three-pipe air conditioning system comprises an indoor set and an outdoor set. The indoor set is provided with a heat exchanger, and the outdoor set is provided with a heat exchanger. Three pipelines are arranged between the indoor set and the outdoor set and used for refrigerant circulation, and the indoor heat exchanger and the outdoor heat exchanger can be in a mode of refrigerating-alone, heating-alone or simultaneous refrigerating and heating. It is well known that the refrigeration lubricating oil is the key factor to ensure the reliable operation of the compressor. The refrigeration lubricating oil circulates in the pipeline along with the refrigerant when the air conditioning system works, and all the pipelines circulate the refrigerant when refrigerating and heating are performed at the same time; however, in the refrigerating-alone or heating-alone mode, some of the three pipelines are not subjected to refrigerant circulation, so that the lubricating oil in the pipeline cannot smoothly return to the compressor, thereby affecting the performance of the air conditioning system.

SUMMARY

The present disclosure mainly aims to provide an oil return control method of an air conditioning system and aims to solve the technical problem of oil return control in the existing three-pipe air conditioning system.

In order to achieve the purpose, the present disclosure provides in embodiments an oil return control method of an air conditioning system, which is used for a three-pipe air conditioning system, wherein the three-pipe air conditioning system comprises a compressor, an outdoor heat exchanger, an indoor heat exchanger, a gas-liquid separator, a first pipeline, a second pipeline and a third pipeline, the compressor is sequentially communicated with the outdoor heat exchanger, the first pipeline, the indoor heat exchanger, the second pipeline and the gas-liquid separator to achieve refrigerant circulation in a refrigerating-alone mode;

the compressor is sequentially communicated with a third pipeline, an indoor heat exchanger, a first pipeline, an outdoor heat exchanger and a gas-liquid separator to achieve refrigerant circulation in a heating-alone mode;

in a refrigerating-heating mode, the outdoor heat exchanger, the first pipeline, the indoor heat exchanger and the second pipeline are used for refrigerating circulation, and the third pipeline, the indoor heat exchanger, the first pipeline and the outdoor heat exchanger are used for heating circulation;

the oil return control method comprising the following steps:

step S1: controlling the compressor to operate at a first frequency in a refrigerating-alone mode or a heating-alone mode;

step S2: judging whether an operating time duration during which the compressor operates at the first frequency reaches a first preset time or not;

if so, performing step S3: allowing the air conditioning system to be in an oil return state, controlling the compressor, the third pipeline, the second pipeline and the gas-liquid separator to be communicated in sequence to form a refrigerant circulation loop, and controlling the compressor, the outdoor heat exchanger, the first pipeline, the indoor heat exchanger, the second pipeline and the gas-liquid separator to be communicated in sequence.

Preferably, the three-pipe air conditioning system further comprises a first electromagnetic valve, a second electromagnetic valve and a first four-way valve, wherein the compressor, the first four-way valve, the third pipeline, the second electromagnetic valve, the first electromagnetic valve, the second pipeline and the gas-liquid separator are sequentially connected;

"step S3: allowing the air conditioning system to be in an oil return state, controlling the compressor, the third pipeline, the second pipeline and the gas-liquid separator to be communicated in sequence to form a refrigerant circulation loop, and controlling the compressor, the outdoor heat exchanger, the first pipeline, the indoor heat exchanger, the second pipeline and the gas-liquid separator to be communicated in sequence," further comprises:

step S31: controlling the compressor to operate at a second frequency, and opening the first electromagnetic valve and the second electromagnetic valve;

step S32: controlling the first four-way valve to communicate an exhaust pipe of the compressor and the third pipeline; and step S33: allowing refrigerant to flow out of the compressor and pass through the first four-way valve, to drive a lubricating oil in the third pipeline to flow back into the compressor after passing through the second electromagnetic valve, the first electromagnetic valve, the second pipeline and the gas-liquid separator.

Preferably, "step S33: allowing refrigerant to flow out of the compressor and pass through the first four-way valve, to drive a lubricating oil in the third pipeline to flow back into the compressor after passing through the second electromagnetic valve, the first electromagnetic valve, the second pipeline and the gas-liquid separator" further comprises;

step S34: acquiring a total time length during which the first four-way valve communicates the exhaust pipe of the compressor and the third pipeline;

step S35: judging whether the total time length is greater than or equal to a first preset threshold value;

if so, performing step S36: controlling the air conditioning system to perform stopping the oil return state;

if not, continuing to perform step S34.

Preferably, "step S36: controlling the air conditioning system to perform stopping the oil return state" comprises:

step S361: controlling and closing the second electromagnetic valve;

step S362: acquiring a closing time length of the second electromagnetic valve;

step S363: judging whether the closing time length is greater than or equal to a second preset time;

if so, performing step S364: controlling the first four-way valve to cut off communication between the compressor and the third pipeline, and keeping the first electromagnetic valve in an open state.

Preferably, "step S31: controlling the compressor to operate at a second frequency, and opening the first electromagnetic valve and the second electromagnetic valve" further comprises:

step S30: controlling the compressor to operate at a third frequency;

step S301: monitoring an operating time length of the compressor at the third frequency, which is taken as a third preset time.

Preferably, "step S31: controlling the compressor to operate at a second frequency, and opening the first electromagnetic valve and the second electromagnetic valve" and "step S32: controlling the first four-way valve to communicate an exhaust pipe of the compressor and the third pipeline" further comprises:

step S311: acquiring oil return operating time duration during which the air conditioning system is in an oil return state;

step S312: judging whether the oil return operating time duration is greater than or equal to a second preset threshold value;

if so, performing step S32: controlling the first four-way valve to communicate the exhaust pipe of the compressor and the third pipeline;

if not, continuing to circularly perform the steps S311 and S312.

Preferably, a first one-way valve is provided in the third pipeline, and an output end of the first four-way valve is connected to an input end of the one-way valve.

Preferably, the three-pipe air conditioning system further comprises a second four-way valve and a third four-way valve, two ends of each of the second four-way valve and the third four-way valve are respectively connected with the compressor and the outdoor heat exchanger, and in a refrigerating-alone mode, when the compressor is controlled to operate at a first frequency, the first four-way valve cuts off communication between the compressor and the third pipeline, and the second four-way valve and the third four-way valve communicate the compressor and the outdoor heat exchanger.

The present disclosure also provides in embodiments an oil return control device of an air conditioning system, which comprises: a memory, a processor, and an oil return control program of an air conditioning system stored in the memory and driven by the processor, wherein the oil return control program of an air conditioning system implements steps of the oil return control method as described above when executed by the processor.

The present disclosure also proposes in embodiments a storage medium having stored thereon an oil return control program of an air conditioning system which, when executed by a processor, implements steps of the oil return control method of an air conditioning system as described above.

The present disclosure further provides in embodiments an air conditioning system which comprises a compressor, an outdoor heat exchanger, a first pipeline, an indoor heat exchanger, a second pipeline, a gas-liquid separator and a third pipeline connected between the compressor and the indoor heat exchanger connected in sequence to form refrigerating and heating circulation, and the air conditioning system further comprises a controller which controls the air conditioning system to return oil in a refrigerating-alone mode or a heating-alone mode according to the oil return control method as described in the preceding part of the text.

According to the oil return control method of an air conditioning system of the present disclosure, when the air conditioning system is in a refrigerating-alone mode or a heating-alone mode, the frequency at which the compressor normally operates is a first frequency. Oil return is started after operating at the first frequency for a first preset time, the oil return process is simple and rapid, and the compressor, the outdoor heat exchanger, the first pipeline, the indoor heat exchanger, the second pipeline and the gas-liquid separator are controlled to be communicated in sequence in the oil return process, namely the refrigerating mode is carried out. The refrigeration oil can move along with the refrigerant, so that the oil return efficiency is high, and the normal refrigerating and heating of the air conditioning system are not influenced. When the air conditioning system is in an oil return state, the refrigerant output by the compressor is controlled to circulate through the third pipeline and the second pipeline at the same time, and then the refrigerant is sent back to the compressor through the gas-liquid separator. In the circulation process, the refrigerant can drive the lubricating oil in the third pipeline which does not participate in refrigerant circulation in the refrigerating mode and the lubricating oil in the second pipeline which does not participate in refrigerant circulation in the heating mode to circulate back to the compressor. Therefore, non-flowing lubricating oil is prevented from accumulating in the air conditioning system. According to the control logic method, oil return is operated under the condition that normal operation of an air conditioning system is not affected, which means local storage of lubricating oil is avoided, and refrigerant and refrigeration oil of all pipelines can be smoothly circulated into the system, so that the amount of the lubricating oil required by a compressor is guaranteed, and reliability and stability of the system are improved.

BRIEF DESCRIPTION OF THE DRAWINGS

In order to more clearly illustrate the embodiments of the present disclosure or the technical solutions in the prior art, the drawings used in the description of the embodiments or the prior art will be briefly described as follows. Obviously, the drawings in the description below are only some embodiments of the present disclosure, and to a person skilled in the art who would not involve any inventive effort, other figures may also be obtained from the structures shown in these figures.

REFERENCE NUMBERS

Figure 1:
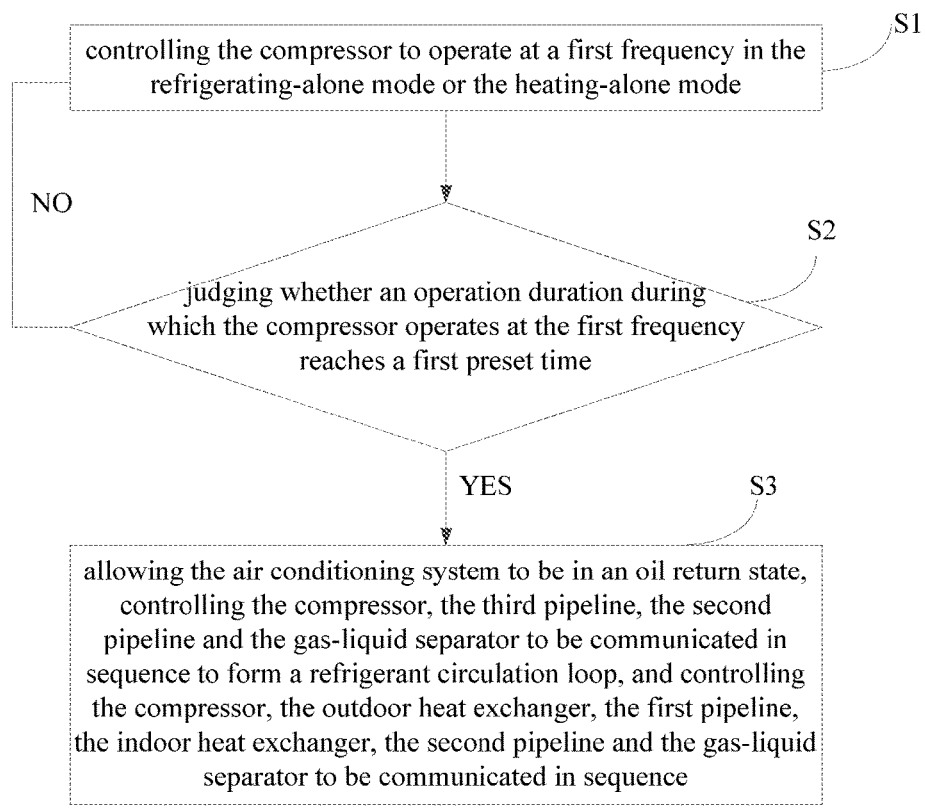
FIG. 1 is a flow diagram of one embodiment of an oil return control method of an air conditioning system of the present disclosure.

| Reference numbers | Terms |
| --- | --- |
| 1 | Compressor |
| 2 | Outdoor heat exchanger |
| 21 | Second four-way valve |
| 22 | Third four-way valve |
| 3 | Gas-liquid separator |
| 4 | Indoor heat exchanger |
| 41 | Second one-way valve |
| 42 | First electromagnetic valve |
| 43 | Second electromagnetic valve |
| 5 | First pipeline |
| 6 | Second pipeline |
| 7 | Third pipeline |
| 71 | First one-way valve |
| 8 | Electronic expansion valve |
| 9 | First four-way valve |

The accomplishment of the objects, functional features and advantages of the present disclosure will be further described in combination with the embodiments, with reference to the accompanying drawings.

DETAILED DESCRIPTION

Reference will now be made to the drawings of the embodiments of the present disclosure. The technical solution in the embodiment of the present disclosure will be clearly and completely described. It is to be understood that the described embodiments are only a portion of the embodiments of the present disclosure and not all embodiments. On the basis of the embodiments in the present disclosure, all other embodiments obtained by a person skilled in the art without involving any inventive effort are within the scope of protection of the present disclosure.

It should be noted that in embodiments of the present disclosure, directional indicators, such as up, down, left, right, front, rear . . . , which are used only to account for the relative positional relationships, motion conditions, etc. between components in a particular pose (as shown in the drawings), change accordingly if the particular pose changes.

In addition, where the description of "first", "second", etc. is referred to in this application, it is used for descriptive purposes only and is not to be construed as indicating or implying relative importance or implicitly indicating the number of technical features indicated. Thus, features defined with "first" and "second" may explicitly or implicitly include at least one such feature. In addition, the technical solutions of the various embodiments can be combined with each other, but must be realized by a person skilled in the art, and when the combination of the technical solutions contradicts each other or cannot be realized, the combination of the technical solutions should be considered to be absent or not within the scope of protection of the present disclosure.

The present disclosure provides an oil return control method of an air conditioning system.

Figure 2:
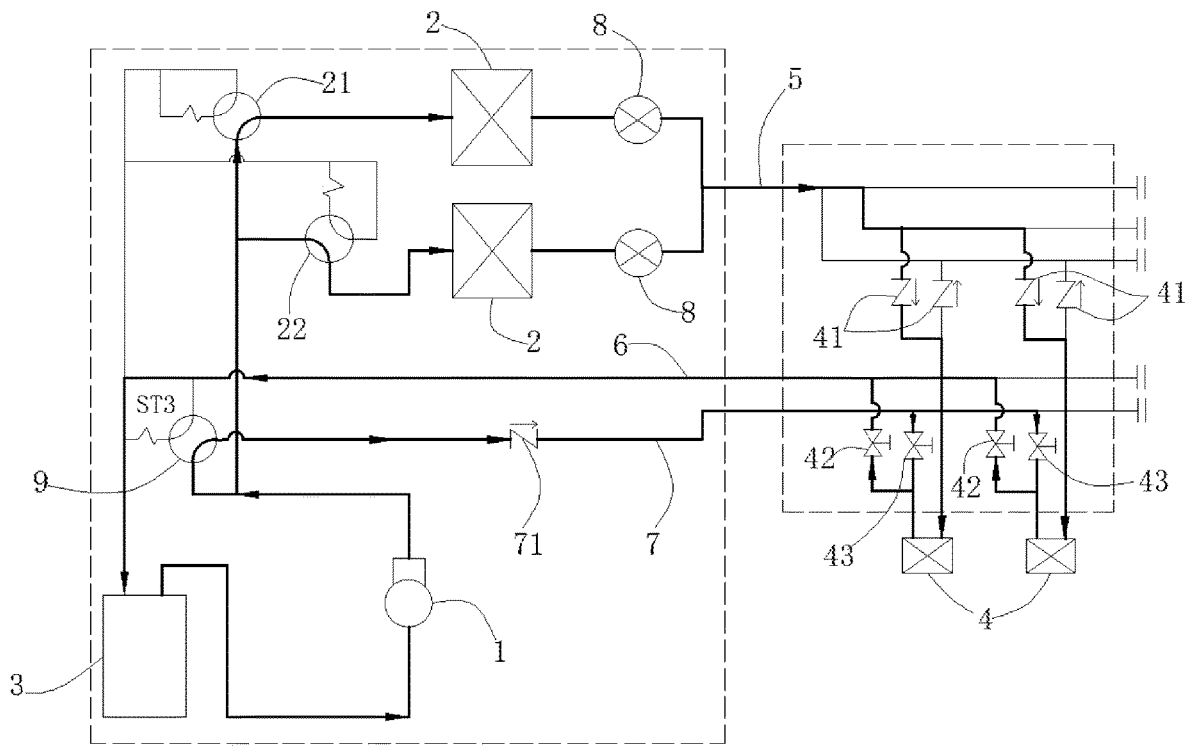
FIG. 2 is a schematic view showing the structure of an embodiment of the air conditioning system of the present disclosure in an oil return state using the oil return control method shown in FIG. 1.

Referring to FIGS. 1 and 2, an oil return control method of an air conditioning system provided by the present disclosure is applied to a three-pipe air conditioning system including a compressor 1, an outdoor heat exchanger 2, an indoor heat exchanger 4, a gas-liquid separator 3, a first pipeline 5, a second pipeline 6, and a third pipeline 7;

the compressor 1 is sequentially communicated with the outdoor heat exchanger 2, the first pipeline 5, the indoor heat exchanger 4, the second pipeline 6 and the gas-liquid separator 3 to achieve refrigerant circulation in a refrigerating-alone mode; the compressor 1 is sequentially communicated with a third pipeline 7, an indoor heat exchanger 4, a first pipeline 5, an outdoor heat exchanger 2 and a gas-liquid separator 3 to achieve refrigerant circulation in a heating-alone mode; in a refrigerating-heating mode, the outdoor heat exchanger 2, the first pipeline 5, the indoor heat exchanger 4 and the second pipeline 6 are used for refrigerating circulation, and the third pipeline 7, the indoor heat exchanger 4, the first pipeline 5 and the outdoor heat exchanger 2 are used for refrigerating and heating circulation;

The oil return control method comprises the following steps:

step S1: controlling the compressor 1 to operate at a first frequency in a refrigerating-alone mode or heating-alone mode;

step S2: judging whether an operating time of the compressor 1 operating at the first frequency reaches a first preset time or not;

if so, performing the step S3: the air conditioning system entering an oil return state, controlling the compressor 1, the third pipeline 7, the second pipeline 6 and the gas-liquid separator 3 to be communicated in sequence to form a refrigerant circulation loop, and controlling the compressor 1, the outdoor heat exchanger 2, the first pipeline 5, the indoor heat exchanger 4, the second pipeline 7 and the gas-liquid separator 3 to be communicated in sequence.

In the embodiment, the first pipeline 5, the second pipeline 6 and the third pipeline 7 are arranged in the three-pipe air conditioning system, and the three pipelines are combined with the compressor 1, the indoor heat exchanger 4, the outdoor heat exchanger 2 and the gas-liquid separator 3 to realize simultaneous refrigerating and heating mode, refrigerating-alone mode and heating-alone mode. The indoor heat exchanger 4 and the outdoor heat exchanger 2 can be provided as one or more as required, so that multi-machine linkage is realized. In the preferred embodiment, two indoor heat exchangers 4 and two outdoor heat exchangers 2 are provided so as to realize a simultaneous refrigerating and heating mode in a simple structure. The air conditioning system further comprises a controller, wherein the controller can be an independent functional component or a control panel which is arranged together with control functional components of other components in the air conditioning system, and the controller is used for controlling the logic control of each component.

When the air conditioning system is in the refrigerating-alone mode, the third pipeline 7 does not participate in the circulation of refrigerant; when the air conditioning system is in the heating-alone mode, the second pipeline 6 does not participate in the circulation of the refrigerant. Therefore, in the embodiment, the refrigerant of the air conditioning system is comprehensively considered to realize continuous circulation in each pipeline, and the compressor 1, the third pipeline 7, the second pipeline 6 and the gas-liquid separator 3 are controlled to be communicated in sequence to form a refrigerant circulation loop. The oil return process is carried out after the refrigerating-alone mode or the heating-alone mode or the mixed mode is operated for a period of time. When the air conditioning system is in the refrigerating-alone mode or a main refrigerating mixed mode, the refrigerating mode is continuously operated, or when the air conditioning system is in the heating-alone mode or a main heating mixed mode, it is switched to the refrigerating mode. When oil return is not carried out, the compressor 1 is controlled to operate at a first frequency for a first preset time. The first frequency can be set according to actual requirements. For example, the first preset time can be set to eight hours, which starts to be calculated as the air conditioning system starts operating in the refrigerating mode or the heating mode, the use rule is met, and normal refrigerating and heating use of a user is not influenced.

According to the oil return control method of an air conditioning system, when the air conditioning system is in a refrigerating-alone mode or a heating-alone mode, the frequency at which the compressor 1 normally operates is a first frequency. Oil return is started after the compressor 1 operates at the first frequency for a first preset time, and the compressor 1, the outdoor heat exchanger 2, the first pipeline 5, the indoor heat exchanger 4, the second pipeline 7 and the gas-liquid separator 3 are controlled to be communicated in sequence in the oil return process, namely a refrigerating mode is carried out. The oil return process is simple and rapid, and normal refrigerating or heating of the air conditioning system is not affected. When the air conditioning system is in an oil return state, the refrigerant output by the compressor 1 is controlled to circulate through the third pipeline 7 and the second pipeline 6, and then the refrigerant is sent back to the compressor 1 through the gas-liquid separator 3. In the circulation process, the refrigerant can drive the lubricating oil in the third pipeline 7 which does not participate in refrigerant circulation in the refrigerating mode and the lubricating oil in the second pipeline 6 which does not participate in refrigerant circulation in the heating mode to circulate back to the compressor 1. Therefore, non-flowing lubricating oil is prevented from accumulating in the air conditioning system. According to the method, under the condition that normal operation of the air conditioning system is not affected, local storage of lubricating oil is avoided, the amount of the lubricating oil required by the compressor 1 is guaranteed, and therefore reliability and stability of the system are improved.

Figure 5:
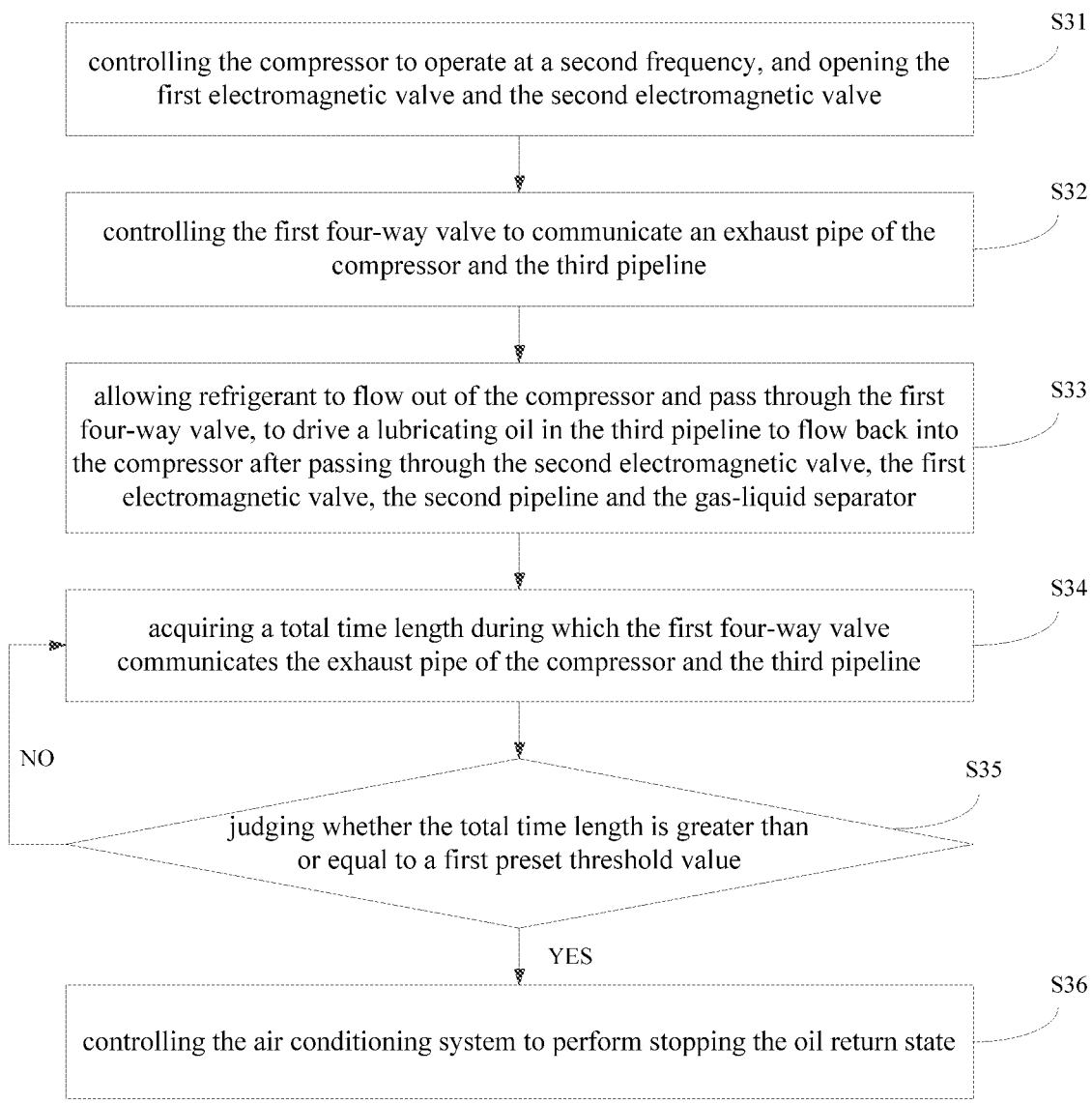
FIG. 5 is a detailed flowchart of an embodiment of step 3 in the oil return control method of an air conditioning system shown in FIG. 1.

Referring to FIG. 5, further, the three-pipe air conditioning system further comprises a first electromagnetic valve 42, a second electromagnetic valve 43 and a first four-way valve 9, wherein the compressor 1, the first four-way valve 9, the third pipeline 7, the second electromagnetic valve 43, the first electromagnetic valve 42, the second pipeline 6 and the gas-liquid separator 3 are sequentially connected, and the "step S3: the air conditioning system entering an oil return state, controlling the compressor 1, the third pipeline 7, the second pipeline 6 and the gas-liquid separator 3 to be communicated in sequence to form a refrigerant circulation loop, and controlling the compressor 1, the outdoor heat exchanger 2, the first pipeline 5, the indoor heat exchanger 4, the second pipeline 7 and the gas-liquid separator 3 to be communicated in sequence" comprises:

step S31: controlling the compressor 1 to operate at a second frequency, and opening the first electromagnetic valve 42 and the second electromagnetic valve 43;

step S32: controlling the first four-way valve 9 to communicate an exhaust pipe of the compressor 1 and the third pipeline 7;

step S33: allowing the refrigerant to flow out of the compressor 1 and pass through the first four-way valve 9, to drive the lubricating oil in the third pipeline 7 to flow back into the compressor 1 after passing through the second electromagnetic valve 43, the first electromagnetic valve 42, the second pipeline 6 and the gas-liquid separator 3.

In this embodiment, the first four-way valve 9 enables the operation stability of the whole air conditioning system to be good, and thus the first four-way valve 9 is exemplified. It is of course also possible to have an electromagnetic valve, which only needs to be controlled to open or close so that the refrigerant output from the compressor 1 enters the third pipeline 7 through it. According to the number of the indoor units which is two, two first electromagnetic valves 42 and two second electromagnetic valves 43 are provided, wherein one first electromagnetic valve 42 is communicated with an indoor heat exchanger 4 and the second pipeline 6, and one second electromagnetic valve 43 is communicated with an indoor heat exchanger 4 and the third pipeline 7.

Meanwhile, in order for both the indoor heat exchanger 4 and the outdoor heat exchanger 2 to realize a refrigerating mode or heating mode, a four-way valve is required to control the reversing of the refrigerant. In order to regulate the pressure in the pipeline, each outdoor heat exchanger 2 is connected with an electronic expansion valve 8, so that the optimal dryness state when entering the indoor heat exchanger 4 during refrigeration is guaranteed, and the evaporation heat exchange capacity is improved.

Taking the provision of two indoor heat exchangers 4 and two outdoor heat exchangers 2 as an example, the three-pipe air conditioning system further comprises a second four-way valve 21 and a third four-way valve 22, two ends of each of the second four-way valve 21 and the third four-way valve 22 are respectively connected with the compressor 1 and an outdoor heat exchanger 2, and in a refrigerating-alone mode, when the compressor 1 is controlled to operate at a first frequency, the first four-way valve cuts off communication between the compressor 1 and the third pipeline 7, and the second four-way valve 21 and the third four-way valve 22 communicate the compressor 1 and the two outdoor heat exchangers 2.

Figure 3:
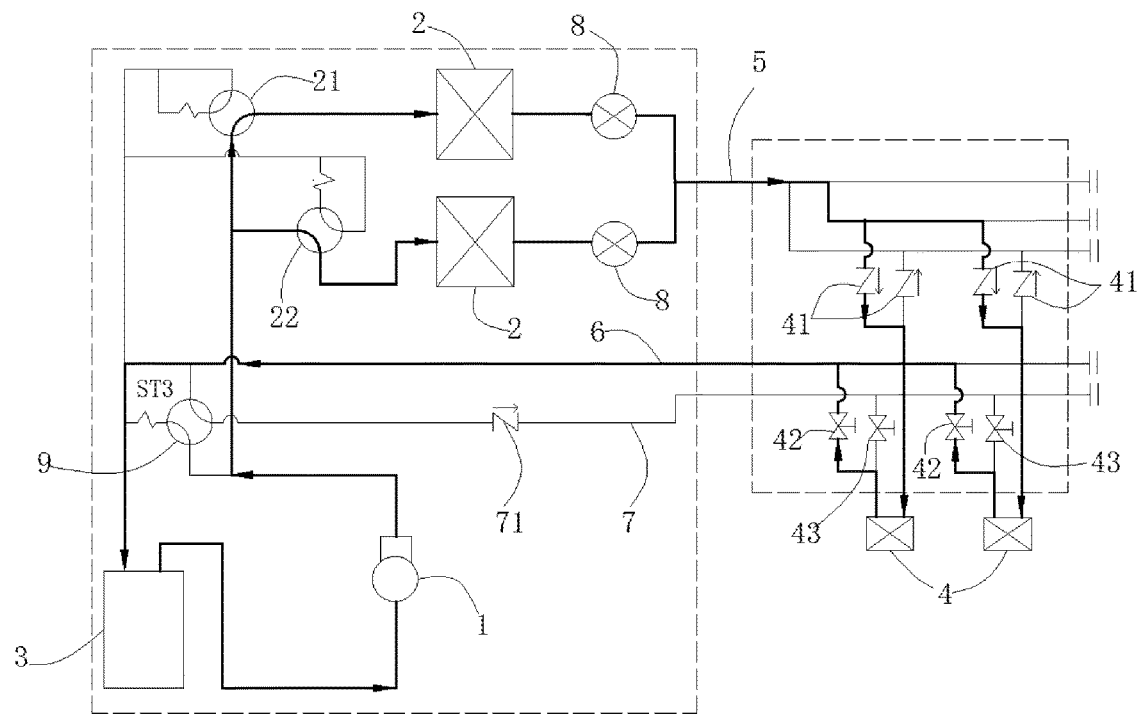
FIG. 3 is a schematic diagram illustrating the structure in a refrigerating mode of an embodiment of an air conditioning system of the present disclosure.

Referring to FIG. 3, two electronic expansion valves 8 are correspondingly provided, and the air conditioning system is in a refrigerating-alone mode. In one embodiment, two indoor heat exchangers 4 and two outdoor heat exchangers 2 participate in refrigerating according to actual requirements. The compressor 1 is sequentially communicated with the two outdoor heat exchangers 2, the first pipeline 5, the two indoor heat exchangers 4, the second pipeline 6 and the gas-liquid separator 3 to achieve refrigerant circulation. Specifically, the high-temperature high-pressure gaseous refrigerant discharged from an exhaust port of the compressor 1 is divided into two paths: one path flowing through the second four-way valve 21, the outdoor heat exchanger 2 and the electronic expansion valve 8, the other path flowing through the third four-way valve 22, the other outdoor heat exchanger 2 and the other electronic expansion valve 8. After being cooled by the outdoor heat exchanger 2, refrigerant is changed into medium-temperature high-pressure liquid and flows out. The refrigerant is combined into a first pipeline 5 through throttling control of the electronic expansion valve 8, and then the refrigerant is divided into two paths to enter the two indoor heat exchangers 4. After being evaporated by the outdoor heat exchanger 2, the refrigerant turns into low-pressure gaseous refrigerant and flows out. It is merged into a second pipeline 6 through the opened first electromagnetic valve 42 to flow to the gas-liquid separator 3, and after gas-liquid separation, the gaseous refrigerant returns to the compressor 1 to be compressed continuously, and is blown indoors by cold air with heat removed.

Figure 4:
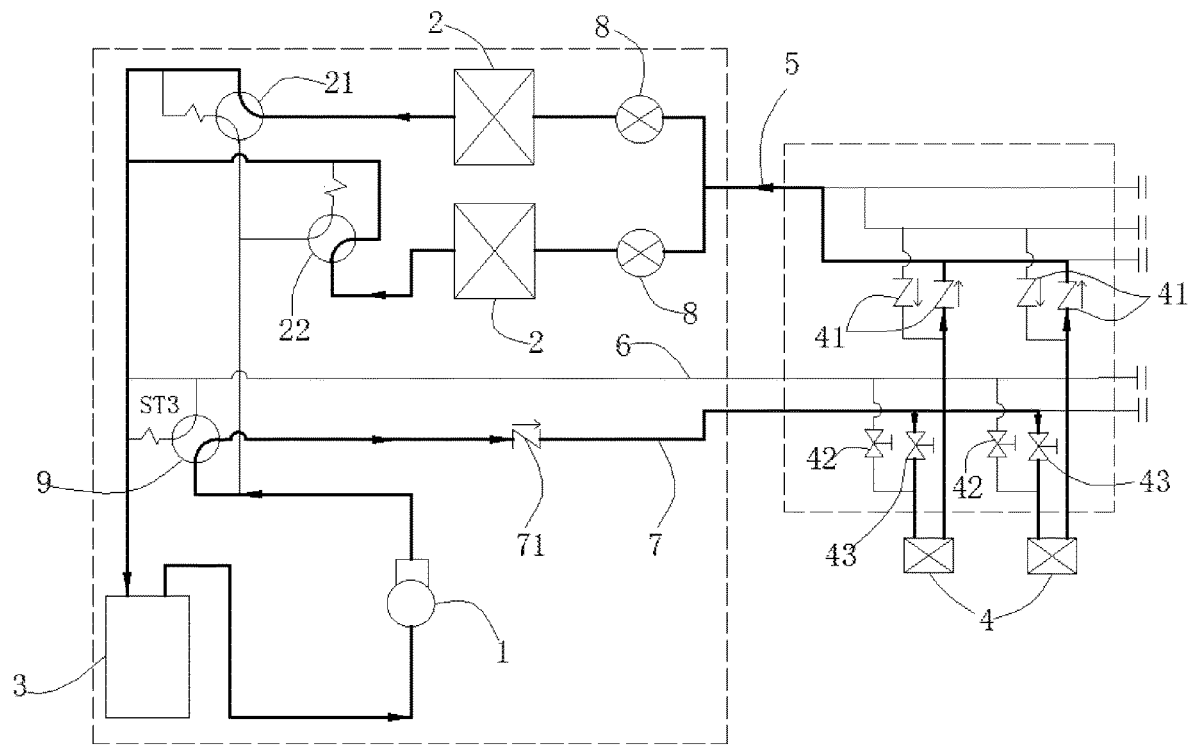
FIG. 4 is a schematic diagram illustrating the structure in a heating mode of an embodiment of an air conditioning system of the present disclosure.

Referring to FIG. 4, in the heating-alone mode of the air conditioning system, the compressor 1 is sequentially communicated with the third pipeline 7, the two indoor heat exchangers 4, the first pipeline 5, the two outdoor heat exchangers 2 and the gas-liquid separator 3 to achieve refrigerant circulation. Specifically, high-temperature and high-pressure gaseous refrigerant is discharged from an exhaust port of the compressor 1, flows out from the third pipeline 7, is divided into two paths to respectively flow through a second electromagnetic valve 43 and an indoor heat exchanger 4, is cooled by the indoor heat exchanger 4 and then is changed into high-pressure liquid refrigerant to flow out. Then the two paths are combined into the first pipeline 5 and then are divided into two paths to enter the two outdoor heat exchangers 2 for heat exchange, and are evaporated by the outdoor heat exchanger 2 and then changed into low-pressure gaseous refrigerant to flow out. The refrigerant then is separated by the gas-liquid separator 3 and enters the compressor 1.

When the air conditioning system in the refrigerating mode enters an oil return state, in order to facilitate reversing of the first four-way valve 9 of the air conditioning system, the compressor 1 is controlled to operate at a second frequency, wherein the value of the second frequency is different from the value of the first frequency. For example, when the first frequency is high, the compressor 1 is controlled to operate at a second frequency lower than the first frequency amount; when the first frequency is low, the compressor 1 is controlled to operate at a second frequency higher than the first frequency. Therefore, the pressure difference in the pipeline is regulated and controlled, so that the first four-way valve 9 can be opened and reversed through a certain pressure difference, the compressor 1 and the third pipeline 7 are communicated, and the oil return mode can be smoothly and quickly entered. In the oil return process, the air conditioning system simultaneously performs a refrigerating mode, and the compressor 1 operates at a second frequency, so that the refrigeration oil of the first pipeline 5 can be further accelerated to circulate, and the performance of the compressor 1 is improved. When it is in the refrigerating mode, the first electromagnetic valve 42 is opened and only the second electromagnetic valve 43 needs to be opened.

When it is in a heating mode and the oil return state is entered, the second electromagnetic valve 43 is in an open state, and only the first electromagnetic valve 42 needs to be controlled to be opened. At this time, the air conditioning system is switched to the refrigerating mode so as to smoothly circulate the refrigeration oil. The first four-way valve 9 is communicated with the compressor 1 and the third pipeline 7, and when the compressor 1 is regulated and controlled to operate at the second frequency, the pressure difference between the compressor 1 and the indoor heat exchanger 4 can also be controlled, so that the refrigerant is controlled to flow to the first electromagnetic valve 42 without flowing to the indoor heat exchanger 4. The smooth oil return process is guaranteed, and the stability of the compressor 1 and the performance of an air conditioning system are further improved.

Further, "step S33: allowing the refrigerant to flow out of the compressor 1 and pass through the first four-way valve, to drive the lubricating oil in the third pipeline 7 to flow back into the compressor 1 after passing through the second electromagnetic valve 43, the first electromagnetic valve 42, the second pipeline 6 and the gas-liquid separator 3" further comprises; step S34: acquiring a total time length during which the first four-way valve communicates an exhaust pipe of the compressor 1 and the third pipeline 7;

step S35: judging whether the total time length is greater than or equal to a first preset threshold value;

if so, performing step S36: controlling the air conditioning system to perform stopping the oil return state;

if not, continuing to perform step S34.

In this embodiment, since the oil return process of the air conditioning system is performed in the refrigerating mode or the heating mode, the oil return process is controlled within a certain time range in order not to affect the normal functional use of the air conditioning system. The total time length during which the first four-way valve communicates the exhaust pipe of the compressor 1 and the third pipeline 7 is acquired, wherein in the step it can be acquired in real time or at a certain time interval, and when the total time length is judged to be greater than or equal to a first preset threshold value, the oil return state can be exited, and then normal refrigerating or heating functions can be carried out. According to the experimental data, the first preset threshold value is set to be 60 s, so that the lubricating oil in the compressor 1 can be kept at a certain demand, the performance of the air conditioning system is stable, and the service life is prolonged.

Figure 6:
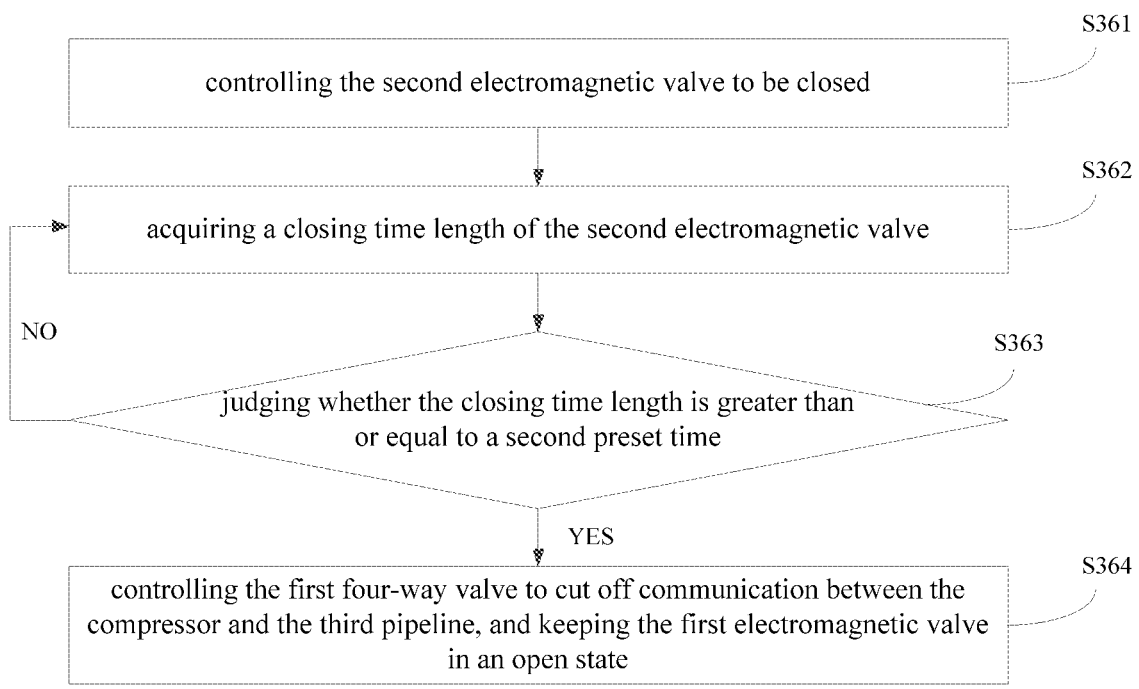
FIG. 6 is a flow chart showing the exiting oil return state in the oil return control method of an air conditioning system shown in FIG. 5.

Referring to FIG. 6, specifically, "step S36: controlling the air conditioning system to perform exit oil return state" comprises:

step S361: controlling and closing the second electromagnetic valve 43;

Step S362: acquiring a closing time length of the second electromagnetic valve 43;

Step S363: judging whether the closing time length is greater than or equal to a second preset time;

if so, performing step S364: controlling the first four-way valve to be energized, and the first electromagnetic valve 42 being maintained in an open state.

In this embodiment, when the air conditioning system returns oil in the refrigerating mode, when exiting the oil return state, the air conditioning system is restored to the previous refrigerating mode again, and at this time, the first four-way valve 9 needs to be controlled to cut off the communication between the compressor 1 and the third pipeline 7. In order to change the direction of the first four-way valve 9 conveniently, besides energizing the first four-way valve 9 and moving the valve inside the first four-way valve 9, a certain pressure difference in the pipeline is needed to jointly drive the first four-way valve 9 to change direction, so that the second electromagnetic valve 43 is firstly closed, the pressure in the third pipeline is increased, and the pressure difference required by the first four-way valve 9 to change direction smoothly is achieved. The first four-way valve 9 is then energized to complete normal commutation. According to the experimental data, when the second electromagnetic valve 43 is closed for 10 s, the first four-way valve 9 is energized at this time, and the direction change can be smoothly carried out, so that the air conditioning system can quickly enter the refrigerating mode, and the normal operation of the function of the air conditioning system is ensured. At this time, the operating frequency of the compressor 1 is restored to the first frequency before oil return, the second four-way valve 21 and the third four-way valve 22 continue to communicate the compressor 1 and the outdoor heat exchanger 2, the first electromagnetic valve and the second electromagnetic valve are all restored to the state before oil return, and the unit enters normal operation control logic.

Figure 7:
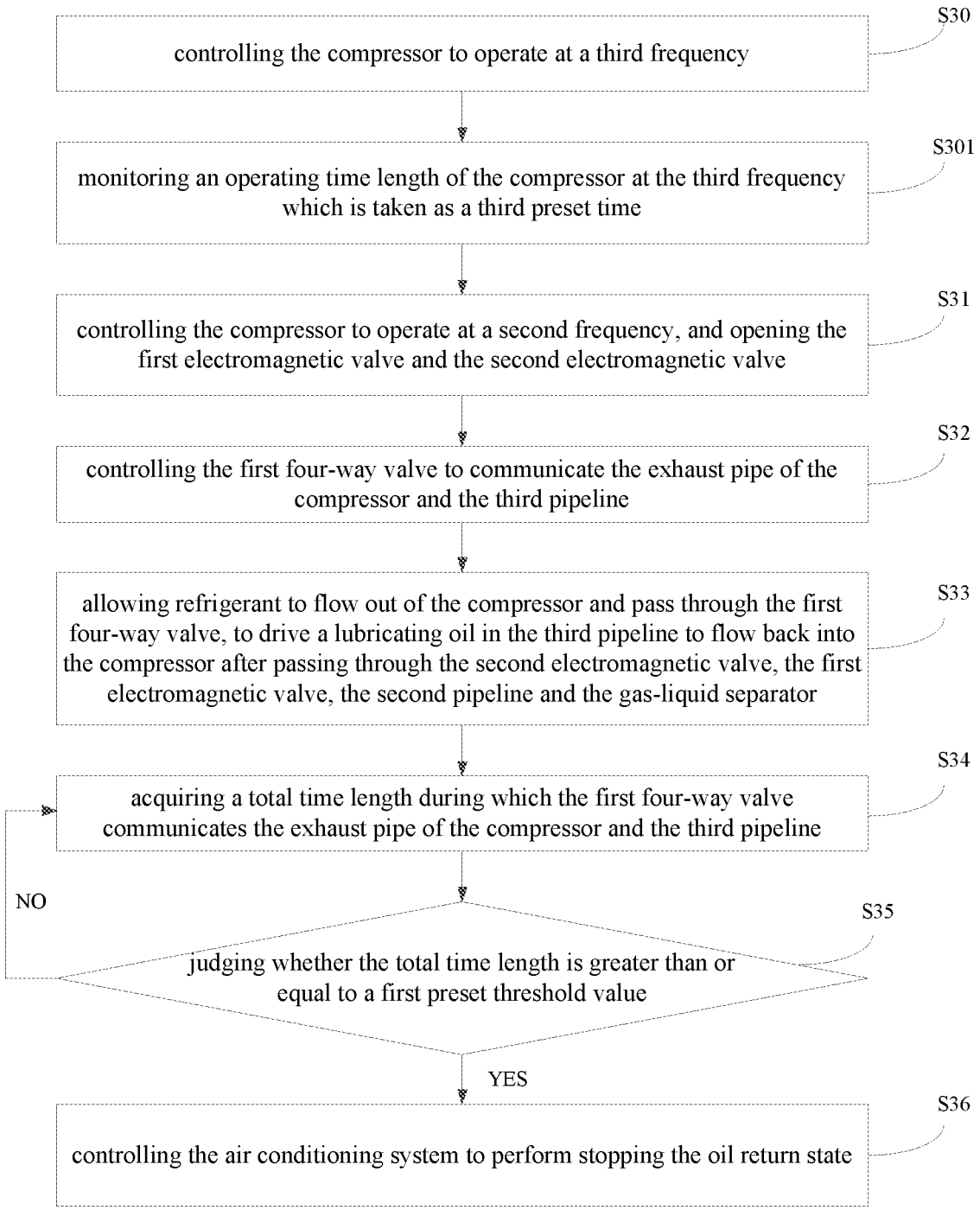
FIG. 7 is a detailed flowchart of another embodiment of step 3 in the oil return control method of an air conditioning system shown in FIG. 1.

Referring to FIG. 7, in another embodiment, before "step S31: controlling the compressor 1 to operate at a second frequency and opening the first electromagnetic valve 42 and the second electromagnetic valve", the method further comprises:

step S30: controlling the compressor 1 to operate at a third frequency;

step S301: monitoring an operating time length of the compressor 1 at the third frequency which is taken as a third preset time.

In the embodiment, when the air conditioning system is judged to enter the oil return state, the compressor 1 is controlled to operate at a third frequency, and the value of the third frequency only needs to be different from the values of the first frequency and the second frequency. When the air conditioning system operates at a high frequency for a long time, it needs to be switched into low frequency operation to improve the operation reliability of the system; when the air conditioning system operates at a low frequency for a certain time, it also needs to be switched into high frequency operation, so that the flow rate of the refrigerant in the pipeline is increased, and the circulation rate of the refrigeration oil is increased. The time length that the compressor 1 operates at the third frequency, i.e. the third preset time, may be set to 120 s, so that the first four-way valve 9 enters the oil return state at the optimum pressure.

Preferably, "step S31: controlling the compressor 1 to operate at a second frequency and opening the first electromagnetic valve 42 and the second electromagnetic valve 43" and "step S32: controlling the first four-way valve 9 to communicate between an exhaust port of the compressor 1 and the third pipeline 7" further comprise:

step S311: acquiring oil return operating time of the air conditioning system entering the oil return state;

step S312: judging whether the oil return operating time is greater than or equal to a second preset threshold value;

if so, performing step S32: controlling the first four-way valve 9 to communicate an exhaust pipe of the compressor 1 and the third pipeline 7;

if not, continuing to circularly perform step S311 and step S312.

In the embodiment, the air conditioning system controls the compressor 1 to operate at a third frequency for a third preset time in a refrigerating mode, and then adjusts the flow and the pressure difference of the refrigerant in the whole pipeline, so that the reversing of the first four-way valve 9 is facilitated; then, the compressor 1 is controlled to operate at a second frequency so as to adjust the pressure difference between the third pipeline 7 and the second pipeline 6, the reversing of the first four-way valve 9 is further facilitated, and meanwhile, the refrigerant circulation rate is ensured to be proper in the oil return process, so that the frozen oil in the third pipeline 7 and the second pipeline 6 can be driven to rapidly circulate and flow, and the oil return efficiency is improved. In the oil return process, when the air conditioning system enters an oil return state, the compressor 1 operates at a second frequency, whether the oil return operating time reaches the second preset threshold value or not is acquired at the moment, and the second preset threshold value is set to be 120 s. When the oil return operating time reaches the second preset threshold value, the first four-way valve 9 is powered down, an exhaust pipe of the compressor 1 and the third pipeline 7 are communicated, and the reversing of the first four-way valve 9 can be effectively ensured by the pressure difference at the moment.

Referring again to FIG. 2, preferably the third pipeline 7 is provided with a first one-way valve 71, an output end of the first four-way valve 9 is connected to an input end of the one-way valve.

In the embodiment, the arrangement of the first one-way valve 71 can ensure that the refrigerant gas discharged by the compressor 1 flows to the second electromagnetic valve 43 through the first four-way valve 9 in the oil return state without reverse flow, thereby ensuring the stability of oil return; meanwhile, friction and noise in the third pipeline 7 can be reduced, and the performance of the air conditioning system is improved.

The present disclosure also provides in embodiments an oil return control device of an air conditioning system (not shown), which comprises: a memory, a processor, and an oil return control program of an air conditioning system stored in the memory and driven by the processor, the oil return control program of an air conditioning system implements steps of the oil return control method as described above when executed by the processor. Because the oil return control device of an air conditioning system adopts all the technical solutions of all the embodiments, at least all the beneficial effects brought by the technical solutions of the embodiments are contained therein and not described in detail.

The present disclosure also proposes in embodiments a storage medium having stored thereon an oil return control program of an air conditioning system which, when executed by a processor, implements a step of the oil return control method of an air conditioning system as described above. Since the storage medium adopts all the technical solutions of all the above-mentioned embodiments, at least all the beneficial effects brought about by the technical solutions of the above-mentioned embodiments are contained therein and not repeated here.

The present disclosure further provides in embodiments an air conditioning system which comprises a compressor 1, an outdoor heat exchanger 2, a first pipeline 5, an indoor heat exchanger 4, a second pipeline 6, a gas-liquid separator 3 and a third pipeline 7 which is connected between the compressor 1 and the indoor heat exchanger 4 connected in sequence to form refrigerating and heating circulation, and the air conditioning system further comprises a controller which controls the air conditioning system to return oil in a refrigerating-alone mode or a heating-alone mode according to the oil return control method as described above. Because the air conditioning system adopts all the technical solutions of all the embodiments, at least all the beneficial effects brought by the technical solutions of the embodiments are contained therein and not described in detail.

In the embodiment, the air conditioning system is a three-pipe air conditioning system, and further comprises a first electromagnetic valve 42, a second electromagnetic valve 43 and a first four-way valve 9, wherein the compressor 1, the first four-way valve 9, the third pipeline 7, the second electromagnetic valve 43, the first electromagnetic valve 42, the second pipeline 6 and the gas-liquid separator 3 are sequentially connected. If the number of the indoor heat exchangers 4 and the outdoor heat exchangers 2 is two, two first electromagnetic valves 42 and two second electromagnetic valves 43 are arranged, wherein one first electromagnetic valve 42 is communicated with one indoor heat exchanger 4 and the second pipeline 6, and one second electromagnetic valve 43 is communicated with one indoor heat exchanger 4 and the third pipeline 7. Meanwhile, in order to enable the two indoor heat exchangers 4 and the two outdoor heat exchangers 2 to realize a refrigerating mode or heating mode, the air conditioning system further comprises a second four-way valve 21 and a third four-way valve 22, two ends of each of the second four-way valve 21 and the third four-way valve 22 are respectively connected with the compressor 1 and an outdoor heat exchanger 2, and each outdoor heat exchanger 2 is connected with an electronic expansion valve 8 in order to regulate the pressure in a pipeline. In addition, the air conditioning system further includes at least four second one-way valves 41.

Referring to FIG. 3 in combination, the air conditioning system is in a refrigerating-alone mode. In one embodiment, both the two indoor heat exchangers 4 and the two outdoor heat exchangers 2 participate in refrigerating according to actual requirements. The compressor 1 is sequentially communicated with the two outdoor heat exchangers 2, the first pipeline 5, the two indoor heat exchangers 4, the second pipeline 6 and the gas-liquid separator 3 to achieve refrigerant circulation. Specifically, the high-temperature high-pressure gaseous refrigerant discharged from the exhaust port of the compressor 1 is divided into two paths: one path flowing through the second four-way valve 21, an outdoor heat exchanger 2 and an electronic expansion valve 8, the other path flowing through the third four-way valve 22, the other outdoor heat exchanger 2 and the other electronic expansion valve 8. After being refrigerated by the outdoor heat exchanger 2, refrigerant is changed into low-temperature high-pressure liquid to flow out, the refrigerant is combined into the first pipeline 5 through throttling control of the electronic expansion valve 8, and then divided into two paths which flow through two second one-way valves 41 to enter the two indoor heat exchangers 4. After being evaporated by the outdoor heat exchanger 2, the refrigerant changes into low-pressure gaseous refrigerant and flows out. After passing through the opened two first electromagnetic valves 42, the refrigerant is combined into the second pipeline 6 to flow to the gas-liquid separator 3. After gas-liquid separation, the gaseous refrigerant returns to the compressor 1 to be compressed continuously, and is blown indoors by the cold air with heat removed.

Referring to FIG. 4, in the heating-alone mode of the air conditioning system, the compressor 1 is sequentially communicated with the third pipeline 7, the two indoor heat exchangers 4, the first pipeline 5, the two outdoor heat exchangers 2 and the gas-liquid separator 3 to achieve refrigerant circulation. Specifically, a high-temperature and high-pressure gaseous refrigerant is discharged from the exhaust port of a compressor 1, flows out from a third pipeline 7, is divided into two paths which respectively flow through a second electromagnetic valve 43 and an indoor heat exchanger 4, is refrigerated by the indoor heat exchanger 4 and then is changed into a high-pressure liquid refrigerant to flow out. The refrigerant is then subjected to direction control through two second one-way valves 41, and then the two paths are combined into the first pipeline 5 and then are divided into two paths again: one path flowing through an electronic expansion valve 8, an outdoor heat exchanger 2 and a second four-way valve 21, the other path flowing through an electronic expansion valve 8, an outdoor heat exchanger 2 and a third four-way valve 22. The refrigerant is evaporated by the outdoor heat exchanger 2 and then becomes a low-pressure gaseous refrigerant to flow out, and enters the compressor 1 after being separated by the gas-liquid separator 3.

Referring to FIG. 2, when the air conditioning system is in an oil return state, the refrigerant flowing out of the compressor 1 passes through the first four-way valve 9, drives the lubricating oil in the third pipeline 7 to flow back into the compressor 1 after passing through the second electromagnetic valve 43, the first electromagnetic valve 42, the second pipeline 6 and the gas-liquid separator 3, and the compressor 1, the outdoor heat exchanger 2, the first pipeline 5 and the indoor heat exchanger 4, the second pipeline 7 and the gas-liquid separator 3 are controlled to be sequentially communicated, so that smooth backflow of the frozen oil is facilitated.

The above description is only of the preferred embodiments of the present disclosure, and is not intended to limit the scope of the present disclosure. Insofar as the inventive concept of the present disclosure is concerned, equivalent structural changes on the basis of the specification and drawings of the present disclosure, or direct/indirect applications in other related technical fields thereof, are intended to be embraced within the scope of this application.

What is claimed is:

1. An oil return control method for a three-pipe air conditioning system,
    wherein the three-pipe air conditioning system comprises a compressor, an outdoor heat exchanger, an indoor heat exchanger, a gas-liquid separator, a first pipeline, a second pipeline and a third pipeline,
    the compressor is in sequential fluid communication with the outdoor heat exchanger, the first pipeline, the indoor heat exchanger, the second pipeline and the gas-liquid separator to achieve refrigerant circulation in a refrigerating-alone mode;
    the compressor is in sequential fluid communication with the third pipeline, the indoor heat exchanger, the first pipeline, the outdoor heat exchanger and the gas-liquid separator to achieve refrigerant circulation in a heating-alone mode;
    wherein the oil return control method comprises the following steps:
    step S1: controlling the compressor to operate at a first frequency in the refrigerating-alone mode or the heating-alone mode;
    step S2: confirming that an operation duration during which the compressor operates at the first frequency reaches a first preset time; and
    step S3: operating the three-pipe air conditioning system to enter an oil return state, controlling the compressor, the third pipeline, the second pipeline and the gas-liquid separator to be in sequential fluid communication to form a refrigerant circulation loop; and controlling the compressor, the outdoor heat exchanger, the first pipeline, the indoor heat exchanger, the second pipeline and the gas-liquid separator to be in sequential fluid communication.

2. The oil return control method for the three-pipe air conditioning system according to claim 1, wherein
    the three-pipe air conditioning system further comprises a first electromagnetic valve, a second electromagnetic valve and a first four-way valve, the compressor, the first four-way valve, the third pipeline, the second electromagnetic valve, the first electromagnetic valve, the second pipeline and the gas-liquid separator are sequentially connected, and the step S3 further comprises:

step S31: controlling the compressor to operate at a second frequency, and controlling the first electromagnetic valve and the second electromagnetic valve both being opened or closed;

step S32: controlling the first four-way valve to communicate an exhaust pipe of the compressor and the third pipeline; and step S33: operating refrigerant to flow out of the compressor and pass through the first four-way valve, to drive a lubricating oil in the third pipeline to flow back into the compressor after passing through the second electromagnetic valve, the first electromagnetic valve, the second pipeline and the gas-liquid separator.

3. The oil return control method for the three-pipe air conditioning system according to claim 2, wherein after the step S33, the oil return control method further comprises:

step S34: acquiring a total length of time during which the first four-way valve communicates the exhaust pipe of the compressor and the third pipeline;

step S35: confirming that the total length of time is greater than or equal to a first preset threshold value; and step S36: controlling the three-pipe air conditioning system to stop the oil return state.

4. The oil return control method for the three-pipe air conditioning system according to claim 3, wherein the step S36 further comprises:

step S361: controlling the second electromagnetic valve to be opened;

step S362: acquiring a length of time the second electromagnetic valve is opened;

step S363: confirming that the length of time the second electromagnetic valve is opened is greater than or equal to a second preset time; and step S364: controlling the first four-way valve to cut off communication between the compressor and the third pipeline, and keeping the first electromagnetic in a state from which the first electromagnetic is closed.

5. The oil return control method for the three-pipe air conditioning system according to claim 3, wherein the third pipeline is provided with a first one-way valve, and an output end of the first four-way valve is connected to an input end of the first one-way valve.

6. The oil return control method for the three-pipe air conditioning system according to claim 2, wherein between the step S31 and the step S32, the oil return method further comprises:

step S311: acquiring an oil return operating time duration during which the three-pipe air conditioning system is in the oil return state; and step S312: confirming that the oil return operating time duration is greater than or equal to a second preset threshold value.

7. The oil return control method for the three-pipe air conditioning system according to claim 6, wherein the outdoor heat exchanger comprises a first outdoor heat exchanger and a second outdoor heat exchanger in parallel;

the three-pipe air conditioning system further comprises a second four-way valve and a third four-way valve, the compressor and the first outdoor heat exchanger are in fluid communication through the second four-way valve, the compressor and the second outdoor heat exchanger are in fluid communication through the third four-way valve, in the refrigerating-alone mode, when the compressor is controlled to operate at the first frequency, the first four-way valve cuts off the fluid communication between the compressor and the third pipeline, and the second four-way valve allows the fluid communication between the compressor and the first outdoor heat exchanger, and the third four-way valve allows the fluid communication between the compressor and the second outdoor heat exchanger.

8. The oil return control method for the three-pipe air conditioning system according to claim 2, wherein the third pipeline is provided with a first one-way valve, and an output end of the first four-way valve is connected to an input end of the first one-way valve.

9. An oil return control device for a three-pipe air conditioning system, comprising: a memory, a processor, and an oil return control program to control the three-pipe air conditioning system stored in the memory and driven by the processor, the following text has been inserted: "wherein the three-pipe air conditioning system comprises a compressor, an outdoor heat exchanger, an indoor heat exchanger, a gas-liquid separator, a first pipeline, a second pipeline and a third pipeline, and wherein the oil return control program to control the three-pipe air conditioning system implements all of the steps of the oil return control method according to claim 8 when executed by the processor.

10. A three-pipe air conditioning system, comprising a compressor, an outdoor heat exchanger, a first pipeline, an indoor heat exchanger, a second pipeline, a gas-liquid separator and a third pipeline which is connected between the compressor and the indoor heat exchanger, and the three-pipe air conditioning system further comprises a controller which controls a three-pipe air conditioning system to return oil in a refrigerating-alone mode or heating-alone mode according to the oil return control method according to claim 8.

11. The oil return control method for the three-pipe air conditioning system according to claim 2, wherein the outdoor heat exchanger comprises a first outdoor heat exchanger and a second outdoor heat exchanger in parallel;

the three-pipe air conditioning system further comprises a second four-way valve and a third four-way valve, the compressor and the first outdoor heat exchanger are in fluid communication through the second four-way valve, the compressor and the second outdoor heat exchanger are in fluid communication through the third four-way valve, in the refrigerating-alone mode, when the compressor is controlled to operate at the first frequency, the first four-way valve cuts off the fluid communication between the compressor and the third pipeline, and the second four-way valve allows the fluid communication between the compressor and the first outdoor heat exchanger, and the third four-way valve allows the fluid communication between the compressor and the second outdoor heat exchanger.

12. An oil return control device for a three-pipe air conditioning system, comprising: a memory, a processor, and an oil return control program for the three-pipe air conditioning system stored in the memory and driven by the processor, the following text has been inserted: "wherein the three-pipe air conditioning system comprises a compressor, an outdoor heat exchanger, an indoor heat exchanger, a gas-liquid separator, a first pipeline, a second pipeline and a third pipeline, and wherein the oil return control program to control the three-pipe air conditioning system implements all of the steps of the oil return control method according to claim 2 when executed by the processor.

13. A three-pipe air conditioning system, comprising a compressor, an outdoor heat exchanger, a first pipeline, an indoor heat exchanger, a second pipeline, a gas-liquid separator and a third pipeline which is connected between the compressor and the indoor heat exchanger, and the three-pipe air conditioning system further comprises a controller which controls a three-pipe air conditioning system to return oil in a refrigerating-alone mode or heating-alone mode according to the oil return control method according to claim 2.

14. The oil return control method for the three-pipe air conditioning system according to claim 1, wherein
the three-pipe air conditioning system further comprises a first electromagnetic valve, a second electromagnetic valve and a first four-way valve,
the compressor, the first four-way valve, the third pipeline, the second electromagnetic valve, the first electromagnetic valve, the second pipeline and the gas-liquid separator are in sequential fluid communication, and
the step S3 further comprises:
step S30: controlling the compressor to operate at a third frequency;
step S301: monitoring a length of time the compressor operates at the third frequency reaches a third established time;
step S31: controlling the compressor to operate at the second frequency, and controlling the first electromagnetic valve and the second electromagnetic valve both being opened or closed;
step S32: controlling the first four-way valve to communicate an exhaust pipe of the compressor and the third pipeline; and
step S33: operating refrigerant to flow out of the compressor and pass through the first four-way valve, to drive a lubricating oil in the third pipeline to flow back into the compressor after passing through the second electromagnetic valve, the first electromagnetic valve, the second pipeline and the gas-liquid separator.

15. The oil return control method for the three-pipe air conditioning system according to claim 14, wherein between the step S31 and the step S32, the oil return method further comprises:
step S311: acquiring an oil return operating time duration during which the three-pipe air conditioning system is in the oil return state; and
step S312: confirming that the oil return operating time duration is greater than or equal to a second preset threshold value;
performing the step S32 after a termination of the steps S311 and S312:
confirming that the oil return operating time duration is less than the second preset threshold value, and continuing to circularly perform the steps S311 and S312 until the termination of the steps S311 and S312 if the duration is less than the threshold and the duration is not confirmed.

16. An oil return control device for a three-pipe air conditioning system, comprising: a memory, a processor, and an oil return control program to control the three-pipe air conditioning system stored in the memory and driven by the processor, the following text has been inserted: "wherein the three-pipe air conditioning system comprises a compressor, an outdoor heat exchanger, an indoor heat exchanger, a gas-liquid separator, a first pipeline, a second pipeline and a third pipeline, and wherein the oil return control program to control the three-pipe air conditioning system implements all of the steps of the oil return control method according to claim 1 when executed by the processor.

17. A three-pipe air conditioning system, comprising a compressor, an outdoor heat exchanger, a first pipeline, an indoor heat exchanger, a second pipeline, a gas-liquid separator and a third pipeline which is connected between the compressor and the indoor heat exchanger, and the three-pipe air conditioning system further comprises a controller which controls a three-pipe air conditioning system to return oil in a refrigerating-alone mode or heating-alone mode according to the oil return control method according to claim 1.

* * * * *